United States Patent
Grant et al.

(10) Patent No.: US 10,311,524 B2
(45) Date of Patent: Jun. 4, 2019

(54) HASHTAG SEGMENTATION

(71) Applicant: International Business Machines Corporation, Armonk, NY (US)

(72) Inventors: Robert H. Grant, Austin, TX (US); Jeremy A. Greenberger, Raleigh, NC (US); Zachary M. Greenberger, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/397,841

(22) Filed: Jan. 4, 2017

(65) Prior Publication Data
US 2018/0189394 A1    Jul. 5, 2018

(51) Int. Cl.
*G06Q 50/00*  (2012.01)
*H04L 12/58*  (2006.01)
*H04L 29/06*  (2006.01)
*H04L 29/08*  (2006.01)

(52) U.S. Cl.
CPC .............. *G06Q 50/01* (2013.01); *H04L 51/16* (2013.01); *H04L 51/32* (2013.01); *H04L 67/2804* (2013.01); *H04L 67/42* (2013.01)

(58) Field of Classification Search
CPC ......... G06Q 50/01; H04L 51/16; H04L 51/32; H04L 67/2804; H04L 67/42
See application file for complete search history.

(56) References Cited

U.S. PATENT DOCUMENTS

| | | | |
|---|---|---|---|
| 9,009,162 B1 | 4/2015 | Lui | |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2011/0119133 A1 | 5/2011 | Igelman et al. | |
| 2012/0158863 A1 | 6/2012 | Kikin-Gil et al. | |
| 2012/0240062 A1* | 9/2012 | Passmore | H04L 51/32 |
| | | | 715/758 |
| 2013/0173572 A1 | 7/2013 | Colagiovanni et al. | |
| 2014/0280090 A1* | 9/2014 | Grappo | G06F 17/3053 |
| | | | 707/723 |
| 2015/0127653 A1 | 5/2015 | Keng et al. | |
| 2015/0235243 A1 | 8/2015 | Wilson et al. | |
| 2016/0012739 A1* | 1/2016 | Jafari | G09B 5/06 |
| | | | 434/353 |
| 2016/0188567 A1* | 6/2016 | Pasternack | G06N 7/005 |
| | | | 704/9 |
| 2016/0189040 A1 | 6/2016 | Vickrey et al. | |
| 2018/0131654 A1* | 5/2018 | Nourbakhsh | H04L 51/20 |

(Continued)

OTHER PUBLICATIONS

U.S. Appl. No. 62/419,609, filed Nov. 9, 2016. (Year: 2009).*

(Continued)

*Primary Examiner* — Jay A Morrison
(74) *Attorney, Agent, or Firm* — Yee & Associates, P.C.; Maeve Carpenter

(57) ABSTRACT

Segmenting hashtags is provided. A selection of a sub-hashtag contained within a hashtag is received from a client device via a network. A set of content linked only to the selected sub-hashtag within the hashtag is retrieved. The set of content linked only to the selected sub-hashtag is sent to the client device via the network.

12 Claims, 6 Drawing Sheets

(56) References Cited

U.S. PATENT DOCUMENTS

2018/0203841 A1* 7/2018 Anders .................. H04L 51/32

OTHER PUBLICATIONS

"Deterministic Url and HashTag Segmentation", HackerRank, © 2016, accessed Oct. 18, 2016, 3 pages. https://www.hackerrank.com/challenges/url-hashtag-segmentation.
Doctor, "What Characters Can a Hashtag Include?", LOGIKA Corporation, Jun. 12, 2012, 3 pages. https://www.hashtags.org/featured/what-characters-can-a-hashtah-include/.
"Segmenting Twitter hashtags", Repustate, accessed Oct. 18, 2016, 2 pages. https://blog.repustate.com/segmentling-twitter-hashtags/.
Sheehy, "Using Special Characters in Hashtags", Sidewalk Talk—blog by Sidewalk Branding Co., Jul. 12, 2013, 2 pages. https://sidewalkbranding.net/2013/07/12/hashtag-special-characters/.
"Twitter Hashtag Segmenter," Heroku Cloud Application Platform, accessed Oct. 18, 2016, 1 page. https://newtwitterhashtag.herokuapp.com.

* cited by examiner

HASHTAG SEGMENTATION

BACKGROUND

1. Field

The disclosure relates generally to hashtags and more specifically to segmenting a hashtag that is a combination of two or more defined other hashtags and inserting a special character between each of the two or more defined other hashtags within the hashtag.

2. Description of the Related Art

A hashtag is a type of label or metadata tag used on social network and microblogging sites, which makes it easier for users to find messages with specific content. Users create hashtags by placing the hash symbol or pound sign (#) in front of a word or unspaced phrase, either in the main text of a message or at the end of the message. All letters and numbers must run together without spaces in a hashtag. In addition, a user cannot include punctuation, symbols, or special characters in a hashtag other than the # symbol at the beginning of the hashtag.

Searching using a particular hashtag will present each message that has been tagged with that particular hashtag. For example, on a photo-sharing social media site, a hashtag of #bluesky will allow users to find images that have been tagged as blue sky. Any combination of letters and numbers led by the # symbol is a hashtag. Also, any hashtag, if used by enough individuals, can "trend" and attract more users to a particular discussion. When a hashtag becomes very popular, the hashtag may appear as a "trending topic". Hashtags intended for discussion on a particular topic utilize wording that avoids being caught up with generic conversations on similar topics.

SUMMARY

According to one illustrative embodiment, a computer-implemented method for segmenting hashtags is provided. A computer receives a selection of a sub-hashtag contained within a hashtag from a client device via a network. The computer retrieves a set of content linked only to the selected sub-hashtag within the hashtag. The computer sends the set of content linked only to the selected sub-hashtag to the client device via the network. According to other illustrative embodiments, a computer system and computer program product for segmenting hashtags are provided.

DETAILED DESCRIPTION

Figure 1:
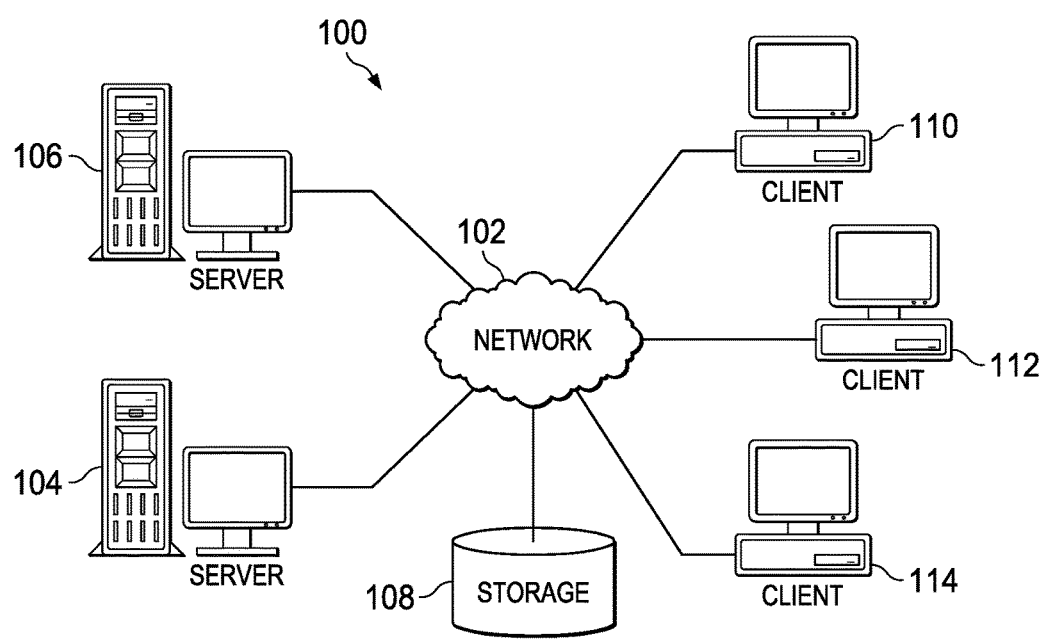
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
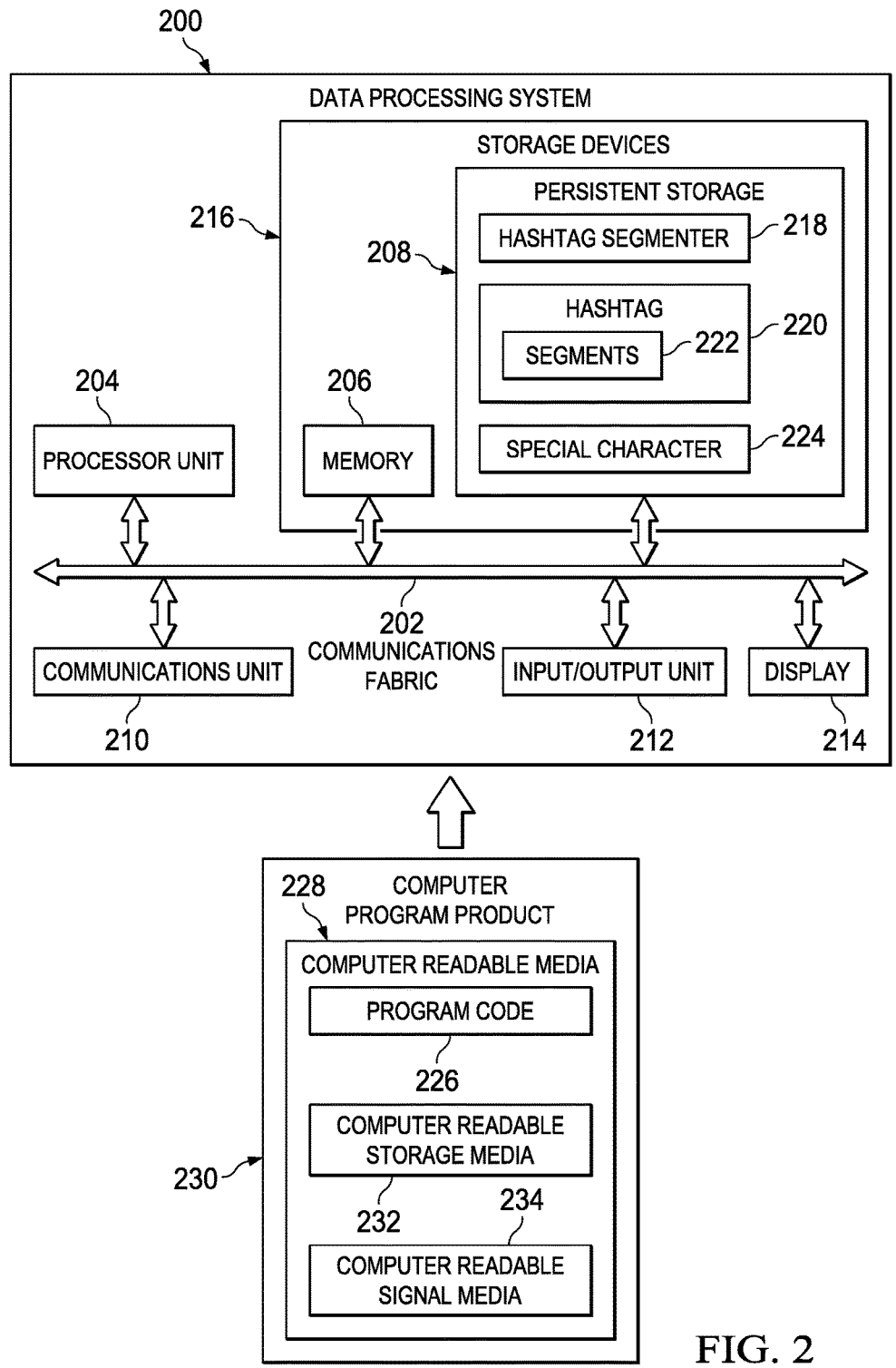
FIG. 2 is a diagram of a data processing system in which illustrative embodiments may be implemented.
Figure 3:
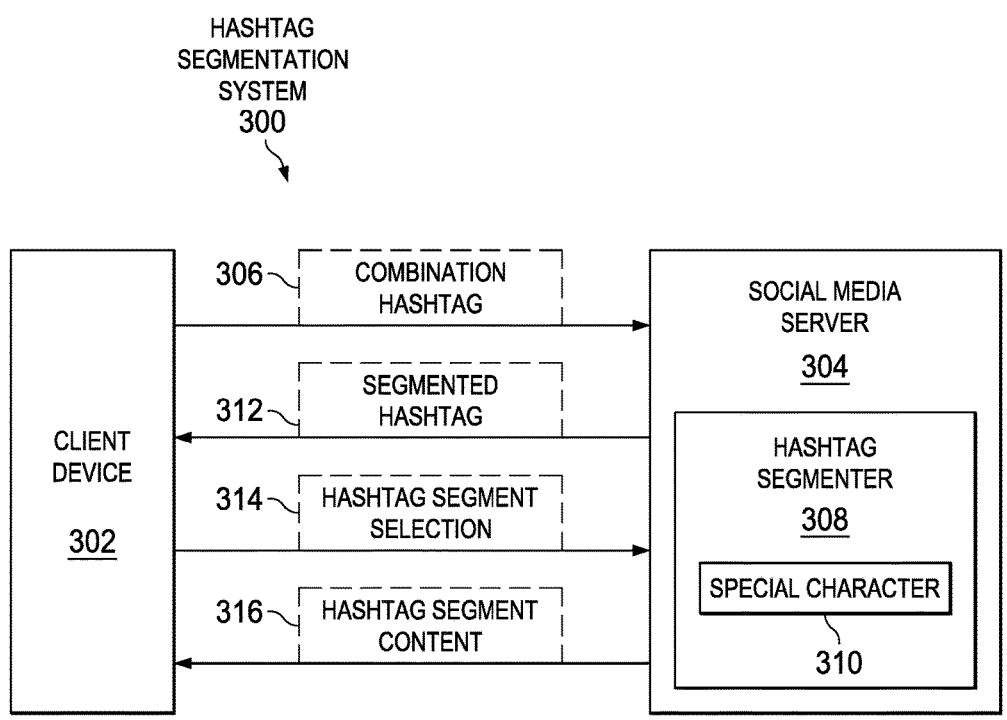
FIG. 3 is a diagram illustrating an example of hashtag segmentation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Server 104 and server 106 may provide a set of one or more services to registered users of client devices connected to network 102. For example, server 104 and server 106 may provide a set of social media services to a plurality of registered users. Further, server 104 and server 106 may, for example, segment hashtags that are a combination of two or more defined other hashtags, insert a special character between each of the two or more defined other hashtags within the hashtag, and present a user interface on client devices allowing registered users to select either whole combination hashtags or only segments of combination hashtags. Also, it should be noted that server 104 and server 106 may represent a plurality of different servers providing a plurality of different social media services.

Client 110, client 112, and client 114 also connect to network 102. Clients 110, 112, and 114 are clients of server 104 and server 106. Further, server 104 and server 106 may provide information, such as boot files, operating system images, and software applications to clients 110, 112, and 114.

In this example, clients 110, 112, and 114 are illustrated as desktop or personal computers with wire or wireless communication links to network 102. However, it should be noted that clients 110, 112, and 114 are meant as examples only. In other words, clients 110, 112, and 114 may include other types of data processing systems, such as, for example, laptop computers, handheld computers, smart phones, cellular phones, smart watches, personal digital assistants, gaming devices, kiosks, set top boxes, and the like. Registered users of clients 110, 112, and 114 may utilize clients 110, 112, and 114 to access the social media services provided by server 104 and server 106.

Storage 108 is a network storage device capable of storing any type of data in a structured format or an unstructured format. In addition, storage 108 may represent a set of one or more network storage devices. Storage 108 may store, for example, names and identification information for a plurality of different registered users; identification of a plurality of different client devices corresponding to the registered users; user profiles corresponding to each of the registered users that may include frequently used hashtags and preferences; et cetera. Further, storage 108 also may store other data, such as authentication or credential data that may include user names, passwords, and biometric data associated with the plurality of different registered users, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores hashtag segmenter 218. Hashtag segmenter 218 segments hashtag 220, which is comprised of a combination of two or more defined other hashtags (i.e., segments 222) and inserts special character 224 between each of the two or more defined other hashtags contained within hashtag 220. Segments 222 represent distinct sub-hashtags contained within hashtag 220 that hashtag segmenter 218 may utilize to retrieve respective corresponding portions of content. Special character 224 may be, for example, any type of character, mark, or symbol not typically used in hashtags, such as the special character "@". Special character 224 also may include a space. In addition, hashtag segmenter 218 presents a user interface on a client device corresponding to a user, such as client 110 in FIG. 1, allowing the user to select either the whole combination hashtag (i.e., hashtag 220) or only one or more segments of segments 222 contained within hashtag 220 to receive desired content corresponding to the user selection.

It should be noted that even though hashtag segmenter 218 is illustrated as residing in persistent storage 208, in an alternative illustrative embodiment hashtag segmenter 218 may be a separate component of data processing system 200. For example, hashtag segmenter 218 may be a hardware component coupled to communication fabric 202 or a combination of hardware and software components.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, keyboard, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 226 is located in a functional form on computer readable media 228 that is selectively removable and may be loaded onto or transferred to data processing system 200 for running by processor unit 204. Program code 226 and computer readable media 228 form computer program product 230. In one example, computer readable media 228 may be computer readable storage media 232 or computer readable signal media 234. Computer readable storage media 232 may include, for example, an optical or magnetic disc that is inserted or placed into a drive or other device that is part of persistent storage 208 for transfer onto a storage device, such as a hard drive, that is part of persistent storage 208. Computer readable storage media 232 also may take the form of a persistent storage, such as a hard drive, a thumb drive, or a flash memory that is connected to data processing system 200. In some instances, computer readable storage media 232 may not be removable from data processing system 200.

Alternatively, program code 226 may be transferred to data processing system 200 using computer readable signal media 234. Computer readable signal media 234 may be, for example, a propagated data signal containing program code 226. For example, computer readable signal media 234 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 226 may be downloaded over a network to persistent storage 208 from another device or data processing system through computer readable signal media 234 for use within data processing system 200. For instance, program code stored in a computer readable storage media in a data processing system may be downloaded over a network from the data processing system to data processing system 200. The data processing system providing program code 226 may be a server computer, a client computer, or some other device capable of storing and transmitting program code 226.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 232 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Hashtags are a universally recognized way for users to connect to content on social media sites. Social media sites utilize hashtags to map and identify social media output to ideas and concepts. However, in the course of developing illustrative embodiments it was discovered that current hashtags do not allow users to segment out parts of a hashtag in order to select, narrow, and/or filter desired content. In addition, users typically utilize long hashtags to ensure that undesired content, which is not relevant, is not mixed in with the content being targeted by the users. However, the utilization of long hashtags may reduce the ability of users to see content that may be useful and of interest for defined segments or portions of a long hashtag.

Illustrative embodiments provide segmentation of long hashtags for more defined or focused searches for user-desired content. Illustrative embodiments provide an ability to dynamically split a hashtag when illustrative embodiments determine that the hashtag is a combination of two or more other defined hashtags. For example, the hashtag #IBMCloudInterConnect2016 may be a combination of three other defined hashtags, such as #IBM, #Cloud, and #InterConnect2016, which are three distinct segments (i.e., #Segment1, #Segment2, and #Segment3) comprising the original hashtag #IBMCloudInterConnect2016. In addition, illustrative embodiments define and insert a character between the different segments for enabling the splitting or segmenting of combination hashtags. For example, illustrative embodiments may insert the special character @ between segments of a combination hashtag, such as #IBM@Cloud@InterConnect2016. In other words, illustrative embodiments would generate, for example, #Segment1 (Special Character), Segment2(Special Character), Segment3(Special Character), and so on, from an original hashtag that is a combination of two or more defined other hashtags. However, it should be noted that illustrative embodiments may utilize and insert any type of character, mark, or symbol between the different hashtag segments or use a space between the different hashtag segments. Further, it should be noted that alternative illustrative embodiments may not insert a special character, mark, or symbol between the different hashtag segments.

Users may narrow or expand hashtag filtering of segments by, for example, mouse clicking on the entire combination hashtag as normal, which will act as a normal hashtag, showing content aggregation using that combination hashtag or holding an input on a touch screen over a particular segment of the combination hashtag or holding down a hot key on a keyboard while selecting the particular segment to see only content corresponding to that particular hashtag segment. In the example above, three hashtag segments or sub-hashtags exist in the combination hashtag #IBMCloudInterConnect2016. In addition, a user may view the full combination hashtag (i.e., #IBMCloudInterConnect2016) by clicking on the full hashtag and then expand the view to see the full combination hashtag, plus two of the three segments (e.g., #IBMCloudInterConnect2016+#IBM+#Cloud).

It should be noted that illustrative embodiments make a change to how hashtags are processed and rendered in social media channels, including changing how hashtags are displayed in a user interface (UI) to show the different segments of a combination hashtag. Illustrative embodiments may select a special character or set of special characters to generate fixed hashtag segments. Illustrative embodiments also may utilize machine cognitive learning to determine confidence ranking of hashtag segments for dynamically selecting which hashtag segments to display in a UI to the user. The confidence ranking of a hashtag segment determines whether that hashtag segment meets criteria for finding content corresponding to the hashtag. Further, illustrative embodiments may provide an ability to toggle between different segments and combinations of segments contained in a combination hashtag.

Furthermore, by using illustrative embodiments, users may reduce the number of letters and numbers they use for their posts. For example, rather than having a hashtag for "IBM" and a hashtag for "IBMInterConnect", a user may have one combination hashtag with multiple substring variations. This is especially useful in social media networks that limit the number of letters and numbers someone can use.

As an example use case, a user types a message with a combination hashtag that includes a set of defined other hashtags. The user sends the message to a social media site where the social media server processes and decomposes the combination hashtag into a set of two or more segments or sub-hashtags. The combination hashtag remains composed in full on the UI of the client device, while the social media server segments the combination hashtag into the set of two or more segments or sub-hashtags and links each segment in the set to a corresponding set of content. When the user views the social media output, the user can select the entire combination hashtag, which shows the full compilation of content, or select a sub-hashtag, which only shows a portion of the full compilation of content corresponding to the selected sub-hashtag only.

Illustrative embodiments define a special character that illustrative embodiments insert between defined segments or sub-hashtags of a combination hashtag. For example, special characters, such as "&", "@", and "^" are not currently valid in hashtags and may be utilized by illustrative embodiments to segment combination hashtags. After a user selects a hashtag that the user would like to view content for, illustrative embodiments read the selected hashtag to look for special characters that segment the hashtag. Illustrative embodiments present a UI on the client device that would allow the user to select the whole hashtag or one or more individual segments of the hashtag. Thus, illustrative embodiments enable the user to select the user's desired option for content.

With reference now to FIG. 3, a diagram illustrating an example of a hashtag segmentation system is depicted in accordance with an illustrative embodiment. Hashtag segmentation system 300 is a system of hardware and software components for segmenting hashtags that are a combination of two or more defined other hashtags, inserting a special character between each of the two or more defined other hashtags within the hashtag, and presenting a UI on client devices allowing users to select whole combination hashtags or only segments of combination hashtags. Hashtag segmentation system 300 may be implemented in a network of data processing systems, such as network data processing system 100 in FIG. 1.

In this example, hashtag segmentation system 300 includes client device 302 and social media server 304. However, it should be noted that hashtag segmentation system 300 may include any number of client devices and server devices. Client device 302 may be, for example, client 110 in FIG. 1. Client device 302 sends combination hashtag 306 to social media server 304 via a network, such as network 102 in FIG. 1. Combination hashtag 306 may be, for example, hashtag 220 containing segments 222 in FIG. 2.

Social media server 304 may be, for example, server 104 in FIG. 1 or data processing system 200 in FIG. 2. Social media server 304 is a server for one or more social media sites. Social media server 304 includes hashtag segmenter 308, such as hashtag segmenter 218 in FIG. 2. After receiving combination hashtag 306, hashtag segmenter 308 segments combination hashtag 306 into the different sub-hashtags and inserts special character 310 in between each of the different sub-hashtags of combination hashtag 306 to form segmented hashtag 312. Special character 310 may be, for example, special character 224 in FIG. 2.

Social media server 304 sends segmented hashtag 312 to client device 302 and presents segmented hashtag 312 in a UI on client device 302 for viewing by a user of client device 302. A selection by the user of one or more segments within segmented hashtag 312 returns hashtag segment selection 314 to social media server 304. Social media server 304 reads hashtag segment selection 314 and then sends hashtag segment content 316 to client device 302. Hashtag segment content 316 represents content that corresponds to the selections made by the user in hashtag segment selection 314.

Figure 4:
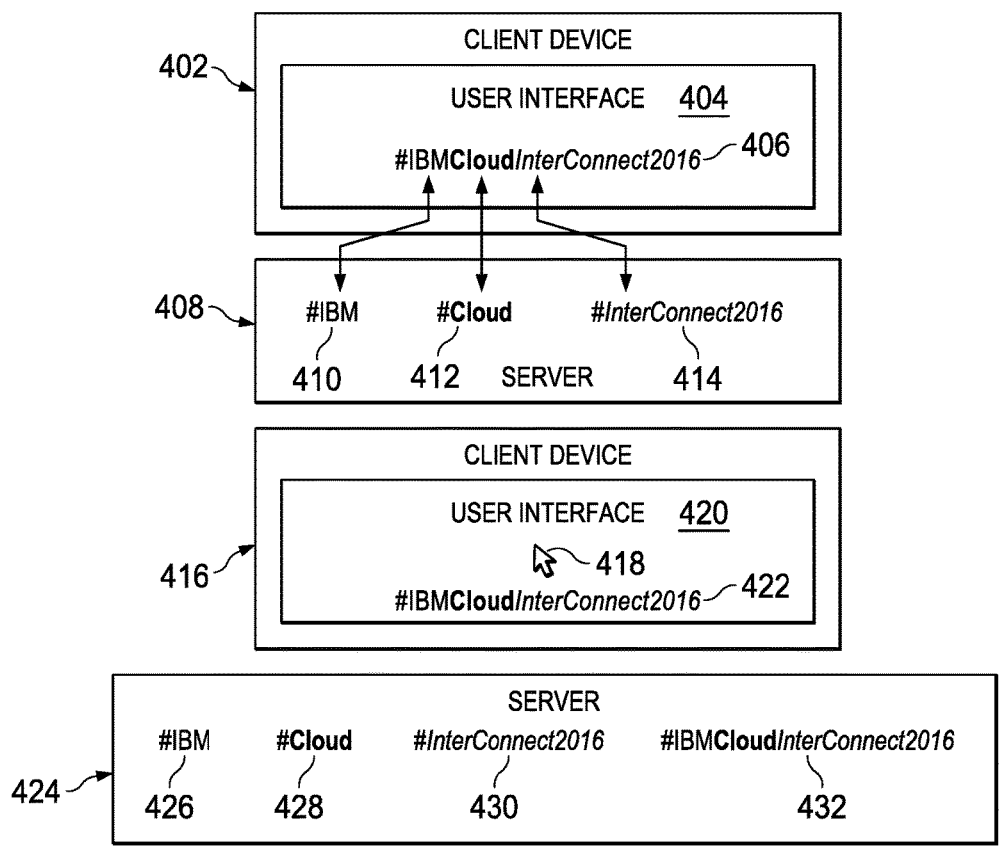
FIG. 4 is a diagram illustrating examples of hashtags in accordance with an illustrative embodiment.

With reference now to FIG. 4, a diagram illustrating examples of hashtags is depicted in accordance with an illustrative embodiment. Client device 402, such as client device 302 in FIG. 3, includes UI 404. User interface 404 displays combination hashtag 406, such as hashtag 220 containing segments 222 in FIG. 2. In this example, combination hashtag 406 is #IBMCloudInterConnect2016.

Server 408, such as social media server 304 in FIG. 3, receives combination hashtag 406, such as combination hashtag 306 in FIG. 3, from client device 402. After receiving combination hashtag 406, server 408 segments combination hashtag into sub-hashtag 410 (e.g., #IBM), sub-hashtag 412 (e.g., #Cloud), and sub-hashtag 414 (e.g., #InterConnect2016).

A user of client device 416, which is the same as client device 402 in this example, may manipulate cursor 418 in UI 420 to select all or a segment of combination hashtag 422. After receiving an indication of the user selection in UI 420, server 424, which is the same as server 408 in this example, sends the content corresponding to the user selection of sub-hashtag 426 (e.g., #IBM), sub-hashtag 428 (e.g., #Cloud), sub-hashtag 430 (e.g., #InterConnect2016), and/or combination hashtag 432 (e.g., #IBMCloudInterConnect2016).

Figure 5:
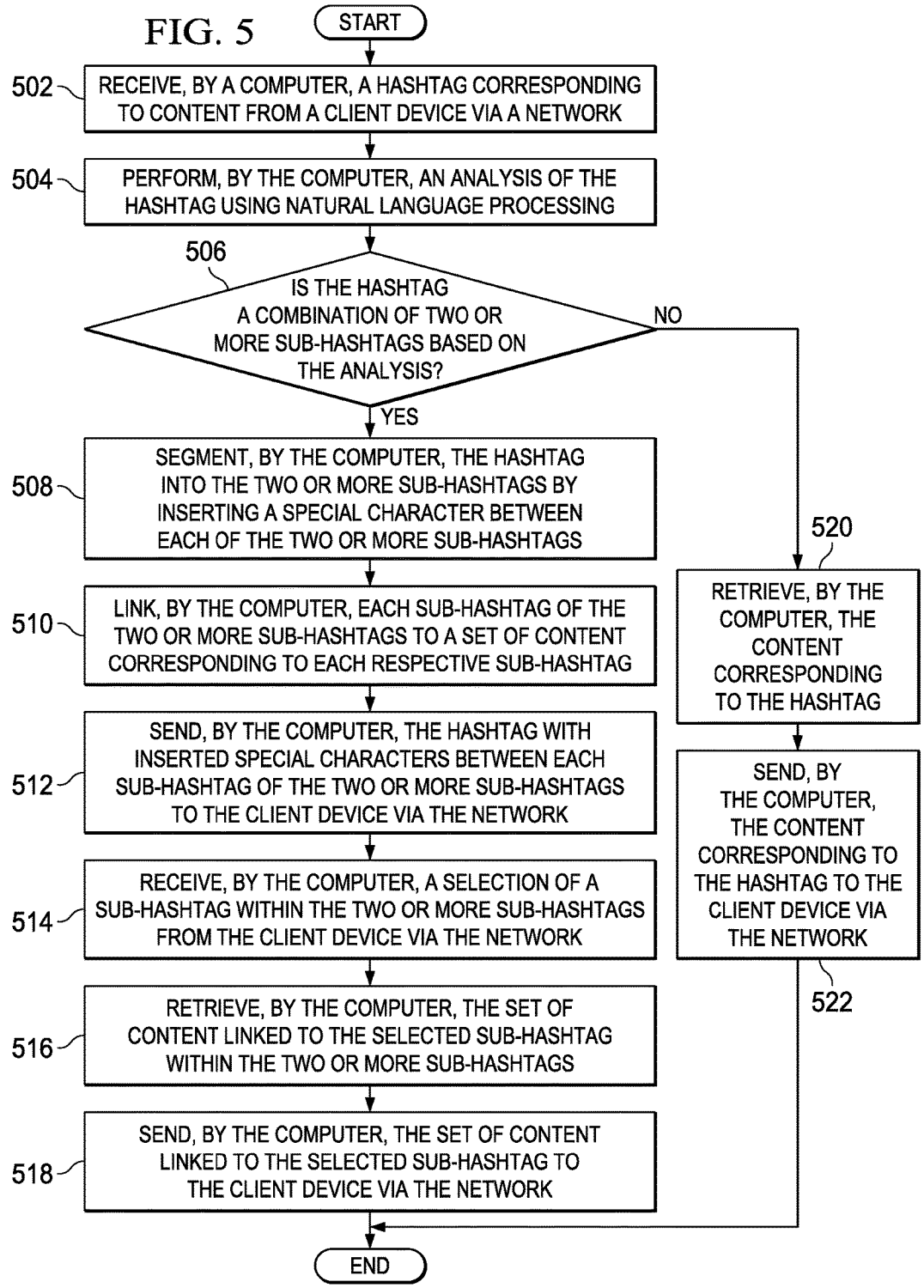
FIG. 5 is a flowchart illustrating a process for segmenting hashtags in accordance with an illustrative embodiment.

With reference now to FIG. 5, a flowchart illustrating a process for segmenting hashtags is shown in accordance with an illustrative embodiment. The process shown in FIG. 5 may be implemented in a computer, such as, for example, server 104 in FIG. 1 or data processing system 200 in FIG. 2.

The process begins when the computer receives a hashtag corresponding to content from a client device via a network (step 502). The hashtag may be, for example, hashtag 220 containing segments 222 in FIG. 2 or combination hashtag 406 in FIG. 4. The client device may be, for example, client device 402 in FIG. 4. The network may be, for example, network 102 in FIG. 1.

Subsequent to receiving the hashtag in step 502, the computer performs an analysis of the hashtag using natural language processing (step 504). Afterward, the computer makes a determination as to whether the hashtag is a combination of two or more sub-hashtags based on the analysis (step 506). If the computer determines that the hashtag is a combination of two or more sub-hashtags based on the analysis, yes output of step 506, then the computer segments the hashtag into the two or more sub-hashtags by inserting a special character between each of the two or more sub-hashtags (step 508). The special character may be, for example, special character 310 in FIG. 3.

In addition, the computer links each sub-hashtag of the two or more sub-hashtags to a set of content corresponding to each respective sub-hashtag (step 510). Further, the computer sends the hashtag with inserted special characters between each sub-hashtag of the two or more sub-hashtags to the client device via the network (step 512). The hashtag with inserted special characters may be, for example, segmented hashtag 312 in FIG. 3.

Subsequently, the computer receives a selection of a sub-hashtag within the two or more sub-hashtags from the client device via the network (step 514). The selection may be, for example, hashtag segment selection 314 in FIG. 3. The computer retrieves the set of content linked to the selected sub-hashtag within the two or more sub-hashtags (step 516). Then, the computer sends the set of content linked to the selected sub-hashtag to the client device via the network (step 518). The set of content linked to the selected sub-hashtag may be, for example, hashtag segment content 316 in FIG. 3. Thereafter, the process terminates.

Returning again to step 506, if the computer determines that the hashtag is not a combination of two or more sub-hashtags based on the analysis, no output of step 506, then the computer retrieves the content corresponding to the hashtag (step 520). In addition, the computer sends the content corresponding to the hashtag to the client device via the network (step 522). Thereafter, the process terminates.

Figure 6:
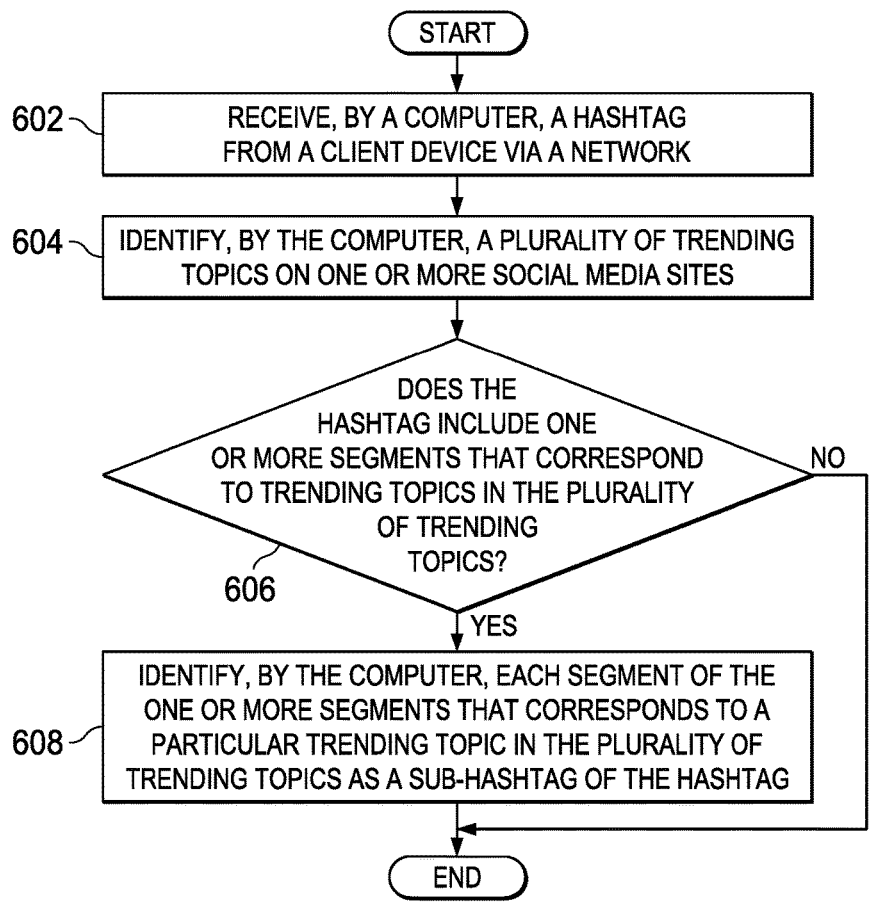
FIG. 6 is a flowchart illustrating a process for identifying segments of a hashtag as sub-hashtags in accordance with an illustrative embodiment.

With reference now to FIG. 6, a flowchart illustrating a process for identifying segments of a hashtag as sub-hashtags is shown in accordance with an illustrative embodiment. The process shown in FIG. 6 may be implemented in a computer, such as, for example, server 104 in FIG. 1 or data processing system 200 in FIG. 2.

The process begins when the computer receives a hashtag from a client device via a network (step 602). The hashtag may be, for example, hashtag 220 containing segments 222 in FIG. 2 or combination hashtag 406 in FIG. 4. The client device may be, for example, client device 402 in FIG. 4. The network may be, for example, network 102 in FIG. 1.

The computer identifies a plurality of trending topics on one or more social media sites (step 604). Then, the computer makes a determination as to whether the hashtag includes one or more segments that correspond to trending topics in the plurality of trending topics (step 606). If the computer determines that the hashtag does not include any segments that correspond to trending topics in the plurality of trending topics, no output of step 606, then the process terminates thereafter. If the computer determines that the hashtag does include one or more segments that correspond to trending topics in the plurality of trending topics, yes output of step 606, then the computer identifies each segment of the one or more segments that corresponds to a particular trending topic in the plurality of trending topics as a sub-hashtag of the hashtag (step 608). Thereafter, the process terminates.

Thus, illustrative embodiments of the present invention provide a computer-implemented method, computer system, and computer program product for segmenting a hashtag that is a combination of two or more defined other hashtags and inserting a special character between each of the two or more defined other hashtags within the hashtag. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for segmenting hashtags, the computer-implemented method comprising:
    receiving, by a computer, a hashtag from a client device via a network;
    determining, by the computer, whether the hashtag contains two or more defined sub-hashtags, wherein the hashtag is a combination of the two or more defined sub-hashtags;
    responsive to the computer determining that the hashtag contains the two or more defined sub-hashtags, segmenting, by the computer, the hashtag by inserting a character between defined sub-hashtags to form a combination hashtag that starts with a hash symbol and includes the character between the defined sub-hashtags without spaces;
    presenting, by the computer, a user interface on the client device that allows a user of the client device to select the combination hashtag as a whole or select only one particular hashtag segment contained in the combination hashtag to receive content corresponding to user selection;
    receiving, by the computer, the user selection from the client device via the network;
    retrieving, by the computer, a set of content linked to the user selection; and
    sending, by the computer, the set of content linked to the user selection to the client device via the network.

2. The computer-implemented method of claim 1, wherein the computer uses natural language processing to analyze the hashtag and determine whether the hashtag contains the two or more defined sub-hashtags.

3. The computer-implemented method of claim 1 further comprising:
    identifying, by the computer, a plurality of trending topics on one or more social media sites;

determining, by the computer, whether the hashtag includes a segment that corresponds to a trending topic in the plurality of trending topics; and responsive to the computer determining that the hashtag includes a segment that corresponds to a trending topic in the plurality of trending topics, identifying, by the computer, the segment that corresponds to the trending topic in the plurality of trending topics as a sub-hashtag contained in the combination hashtag.

4. The computer-implemented method of claim 1, wherein the character is a special character, and wherein the special character is selected from a group consisting of & and ^.

5. The computer-implemented method of claim 1 further comprising:
linking, by the computer, the user selection to the set of content that corresponds to the user selection only.

6. The computer-implemented method of claim 1 further comprising:
determining, by the computer, a confidence ranking corresponding to each hashtag segment in the hashtag;
determining, by the computer, whether each respective hashtag segment meets criteria for finding content corresponding to the hashtag based on the confidence ranking of each respective hashtag segment; and
responsive to the computer determining that one or more respective hashtag segments meet the criteria for finding content corresponding to the hashtag, selecting, by the computer, those respective hashtag segments meeting the criteria for presentation in the user interface within the combination hashtag.

7. A computer system for segmenting hashtags, the computer system comprising:
a bus system;
a storage device connected to the bus system, wherein the storage device stores program instructions; and
a processor connected to the bus system, wherein the processor executes the program instructions to:
receive a hashtag from a client device via a network;
determine whether the hashtag contains two or more defined sub-hashtags, wherein the hashtag is a combination of the two or more defined sub-hashtags;
segment the hashtag by inserting a character between defined sub-hashtags to form a combination hashtag that starts with a hash symbol and includes the character between the defined sub-hashtags without spaces in response to determining that the hashtag contains the two or more defined sub-hashtags;
present a user interface on the client device that allows a user of the client device to select the combination hashtag as a whole or select only one particular hashtag segment contained in the combination hashtag to receive content corresponding to user selection;
receive the user selection from the client device via the network;
retrieve a set of content linked to the user selection; and
send the set of content linked to the user selection to the client device via the network.

8. A computer program product for segmenting hashtags, the computer program product comprising a computer readable storage medium having program instructions embodied therewith, the program instructions executable by a computer to cause the computer to perform a method comprising:
receiving, by the computer, a hashtag from a client device via a network;
determining, by the computer, whether the hashtag contains two or more defined sub-hashtags, wherein the hashtag is a combination of the two or more defined sub-hashtags;
responsive to the computer determining that the hashtag contains the two or more defined sub-hashtags, segmenting, by the computer, the hashtag by inserting a character between defined sub-hashtags to form a combination hashtag that starts with a hash symbol and includes the character between the defined sub-hashtags without spaces;
presenting, by the computer, a user interface on the client device that allows a user of the client device to select the combination hashtag as a whole or select only one particular hashtag segment contained in the combination hashtag to receive content corresponding to user selection;
receiving, by the computer, the user selection from the client device via the network;
retrieving, by the computer, a set of content linked to the user selection; and
sending, by the computer, the set of content linked to the user selection to the client device via the network.

9. The computer program product of claim 8, wherein the computer uses natural language processing to analyze the hashtag and determine whether the hashtag contains the two or more defined sub-hashtags.

10. The computer program product of claim 8 further comprising:
identifying, by the computer, a plurality of trending topics on one or more social media sites;
determining, by the computer, whether the hashtag includes a segment that corresponds to a trending topic in the plurality of trending topics; and
responsive to the computer determining that the hashtag includes a segment that corresponds to a trending topic in the plurality of trending topics, identifying, by the computer, the segment that corresponds to the trending topic in the plurality of trending topics as a sub-hashtag contained in the combination hashtag.

11. The computer program product of claim 8, wherein the character is a special character, and wherein the special character is selected from a group consisting of & and ^.

12. The computer program product of claim 8 further comprising:
linking, by the computer, the user selection to the set of content that corresponds to the user selection only.

* * * * *